Aug. 8, 1939.  S. A. EARNSHAW  2,168,329
PLASTERING APPARATUS
Filed Jan. 2, 1937  4 Sheets-Sheet 1
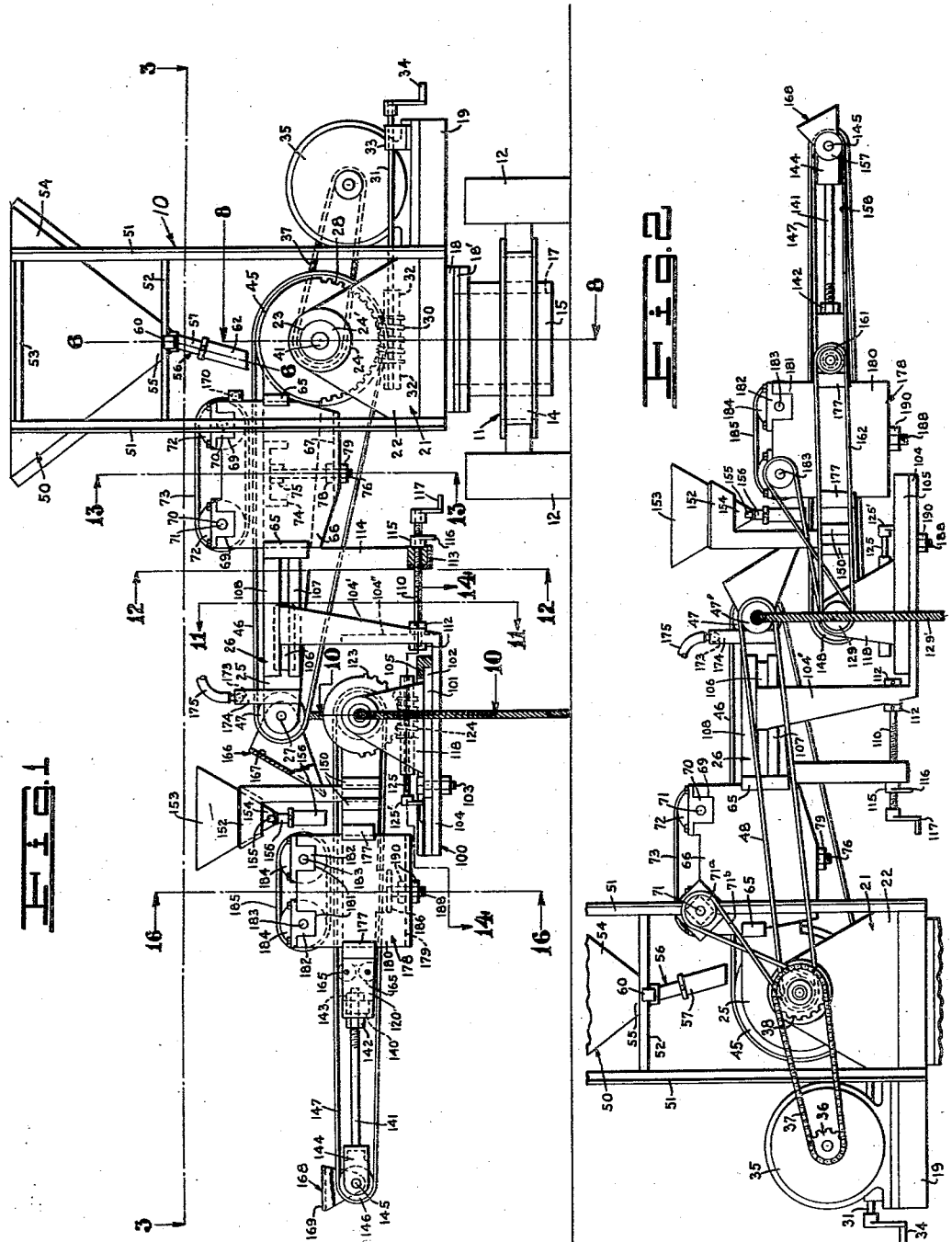
INVENTOR.
S. A. EARNSHAW
BY
ATTORNEY.

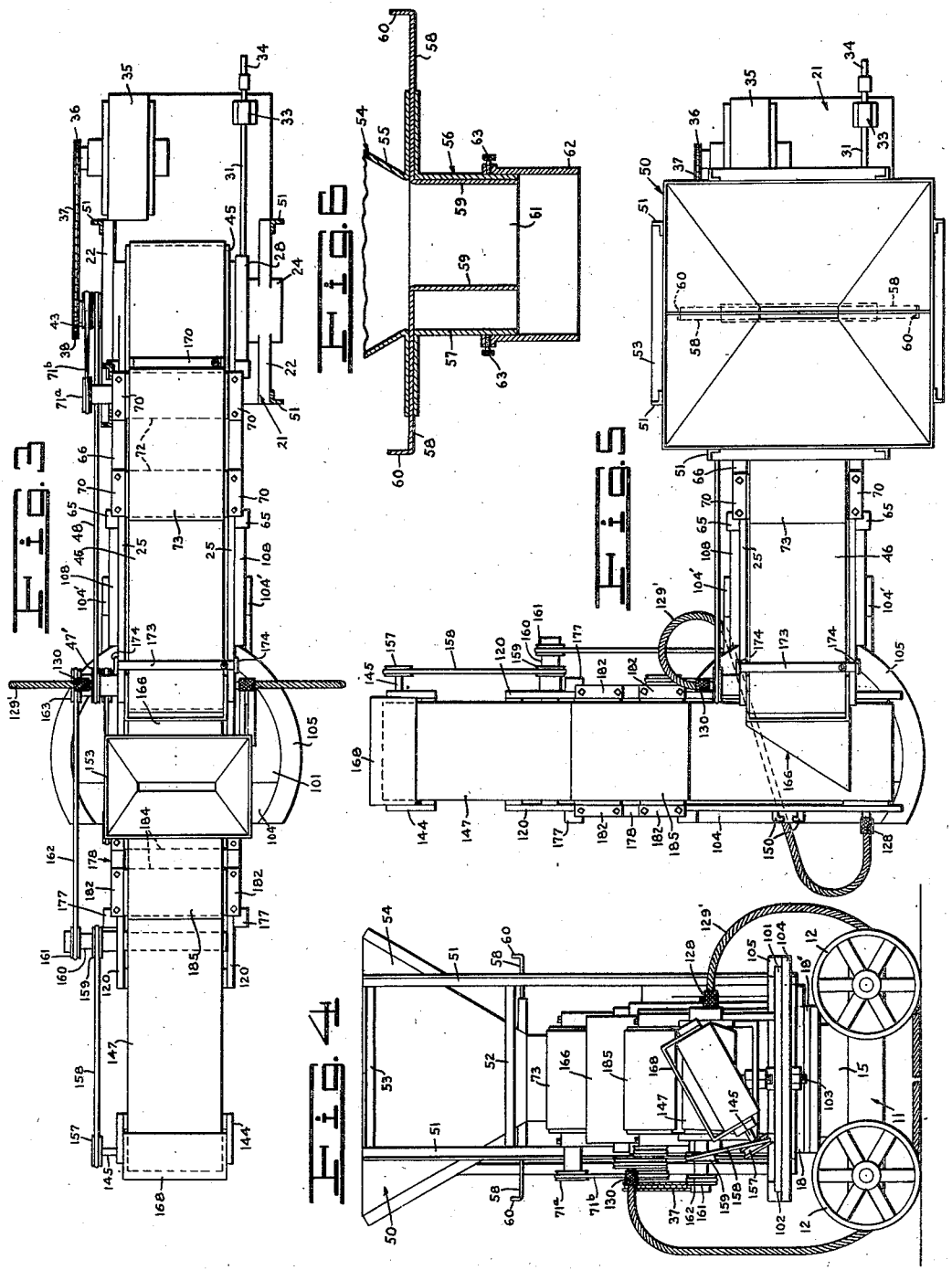

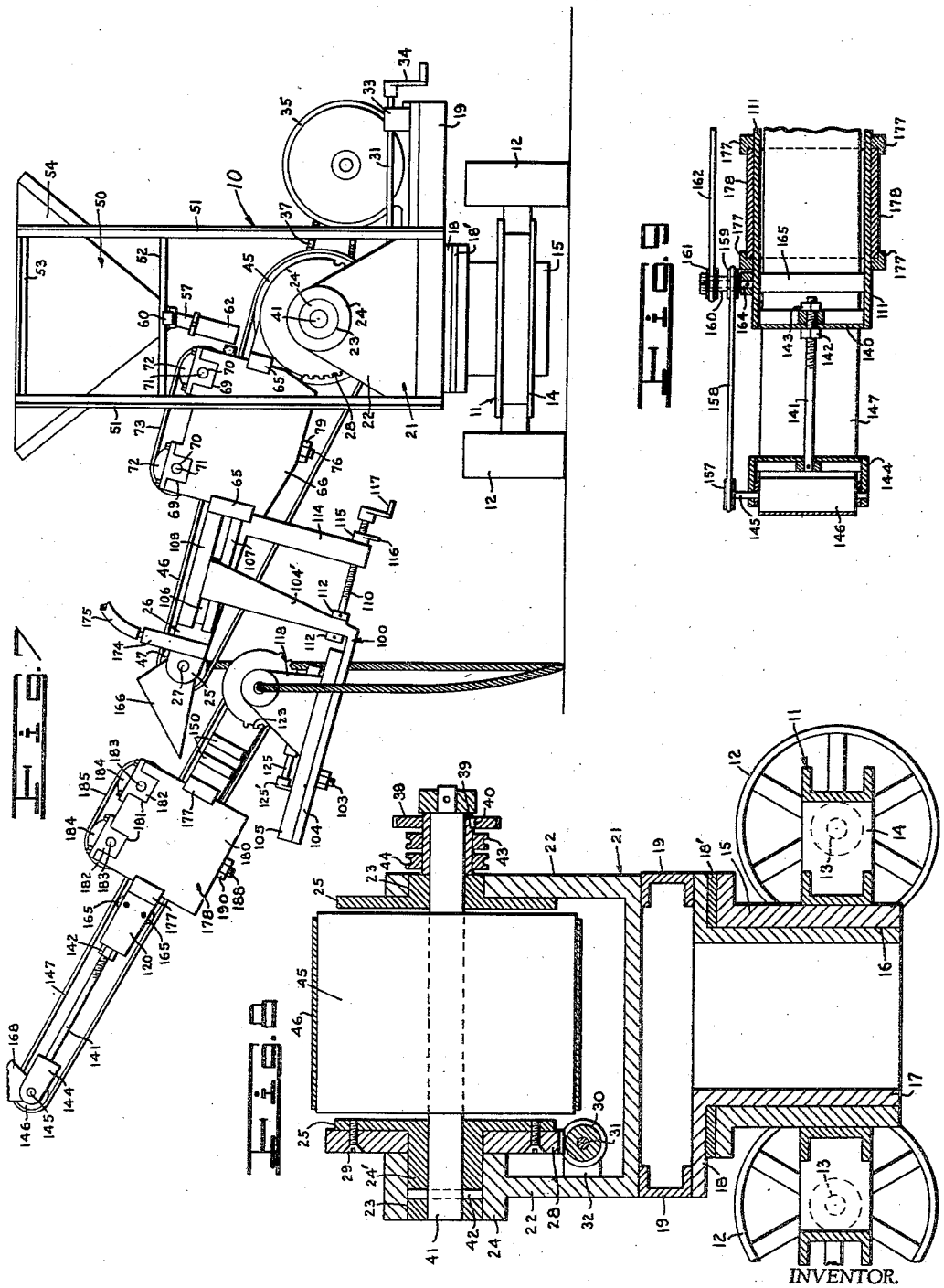

Aug. 8, 1939.     S. A. EARNSHAW     2,168,329
PLASTERING APPARATUS
Filed Jan. 2, 1937     4 Sheets-Sheet 4
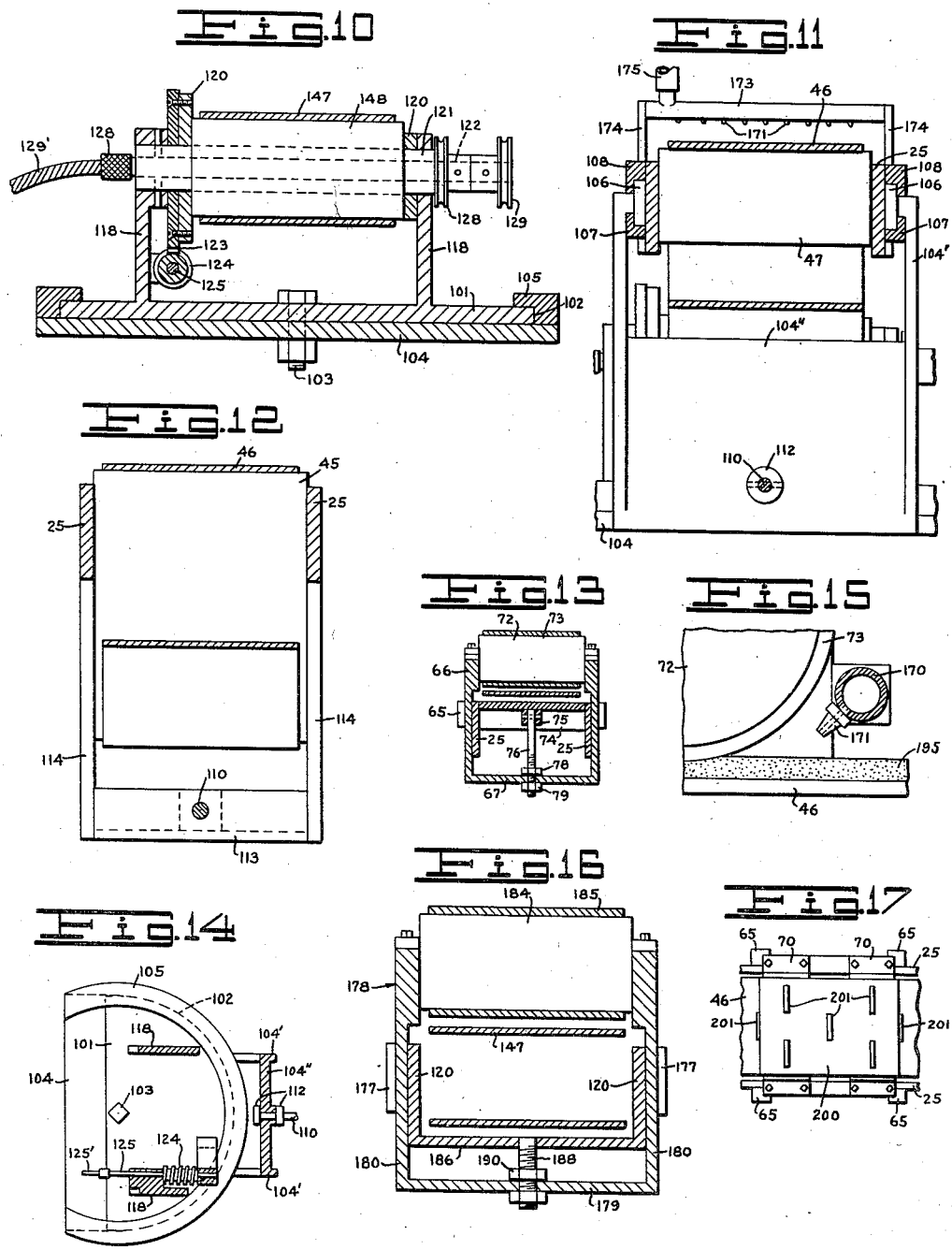
INVENTOR.
S. A. EARNSHAW
BY
ATTORNEY.

Patented Aug. 8, 1939

2,168,329

UNITED STATES PATENT OFFICE 2,168,329

PLASTERING APPARATUS

Spencer A. Earnshaw, Los Angeles, Calif.

Application January 2, 1937, Serial No. 118,777

20 Claims. (Cl. 72—130)

This invention relates to plastering apparatus.

The general object of the invention is to provide an improved apparatus which is particularly adapted for use in applying plaster.

A further object of the invention is to provide an apparatus adapted for handling plastics or fluids and applying such material to a wall, ceiling or other portion of a building or structure.

A more specific object of the invention is to provide an endless belt structure for applying plaster or other plastic or liquid material by means of centrifugal action.

Another object of the invention is to provide a plaster handling apparatus wherein a plurality of endless belt members are mounted in a novel manner for applying the material.

Another object of the invention is to provide a novel endless belt mechanism for use in applying material to a surface.

A further object of the invention is to provide a novel valve mechanism for feeding material to an endless belt apparatus.

Another object of the invention is to provide an endless belt applying apparatus wherein novel means is employed for adjusting the delivery portion of the apparatus and for adjusting the thickness of material applied.

An additional object of the invention is to provide a portable material applying apparatus.

Another object of the invention is to provide a novel support for a material applying apparatus.

An additional object of the invention is to provide a material applying apparatus including a tiltable endless conveyor.

Other objects and the advantages of my invention will be apparent from the following description taken in connection with the accompanying drawings, wherein:

Fig. 1 is a side elevation, partly in section, showing my apparatus;

Fig. 2 is a fragmentary view, similar to Fig. 1, looking towards the other side of the apparatus;

Fig. 3 is a section taken on line 3—3 Fig. 1;

Fig. 4 is a front elevation of the apparatus;

Fig. 5 is a top plan view of the apparatus;

Fig. 6 is a fragmentary section taken on line 6—6 Fig. 1;

Fig. 7 is a side elevation showing the apparatus with the conveyors tilted;

Fig. 8 is a section taken on line 8—8 Fig. 1;

Fig. 9 is a fragmentary section showing the conveyor adjustment;

Figs. 10, 11, 12, 13 and 14 are sections taken on lines 10—10, 11—11, 12—12, 13—13 and 14—14 respectively Fig. 1;

Fig. 15 is a sectional detail showing the nozzle;

Fig. 16 is a section taken on line 16—16 Fig. 1; and

Fig. 17 is a fragmentary elevation showing a modification.

Referring to the drawings by reference characters I have shown my invention as embodied in an apparatus which is indicated generally at 10.

The apparatus described is particularly adapted for use in applying plaster or similar material to the walls or ceiling of structures but it will be apparent from the description that my invention may with equal facility be employed in the application of material such as plastics, paint, finely divided metal, etc. and that the invention may be used in covering or coating various surfaces with plaster, plastic material or other covering material.

As shown this apparatus includes a truck 11 which comprises a plurality of supporting wheels 12 mounted on suitable axles 13 which are in turn supported on channel members 14. These channel members 14 support a base 15 which includes a central cylindrical aperture 16 in which a post 17 is mounted to rotate. The post 17 has a flange 18 which engages a bearing member 18' provided on the base 15 so that the post may rotate.

Mounted on the upper end of the post I show opposed longitudinally extending channel members 19 which as shown in Figs. 1 and 2 project beyond the truck and are disposed so that they will clear the wheels 12 when turned.

Mounted upon the channels 19 I show a base 21. At one end this base includes upwardly extending supports 22. The supports 22 are apertured as at 23 and one of the supports includes a boss 24 as clearly shown in Fig. 8. Mounted within the apertures 23 I show trunnions 24' which are integral with side plates 25 of a frame 26.

The side plates 25 of the frame at the end remote from the trunnions are connected by a shaft 27 so that the two side plates move together. In order to move the side plates I arrange a worm wheel 28 which is apertured to receive the trunnions 24 as shown in Fig. 8 and which is secured to one of the side plates as by screws 29. This worm wheel 28 engages a worm 30 mounted on a rod 31 which is journaled in a bracket 32 on one of the supports 22 as shown in Fig. 8. The rod 31 extends over the channel members 19 as shown in Fig. 7 and is supported in a bracket 33 and is provided with a handle 34 by means of which it may be turned to raise and lower the frame 26. Since the gears 28 and 30 are of the worm type the frame 26 will remain locked in the position to which it is adjusted.

Mounted on the channels 19 I show a motor 35 which drives a sprocket 36 which in turn drives a chain 37. This chain 37 passes over a gear 38 which is mounted on a sleeve 29 and is secured to this sleeve by welding or otherwise so that the motor drives the sleeve 39. The sleeve 39 is mounted free to turn on a shaft 41 which passes through apertures in the bosses 24 and is keyed to one of the bosses by a key 42 so that the shaft 21 is held against turning. Mounted on the sleeve 39 I show a pair of pulleys 43 and 44 which may be welded to the sleeve and the purpose of which will be later described.

Mounted on the shaft 41 I show a drum 45 which is free to turn thereon and over which an endless belt conveyor 46 extends. This belt conveyor also passes over a drum 47 mounted on the shaft 27 previously mentioned. In order to drive the endless belt conveyor 46 I provide the shaft 27 with a pulley 47 (Fig. 2) and this pulley receives a belt 48 which also passes over the pulley 44 previously mentioned. It will thus be seen that when the motor is operated the belt 46 will be driven.

In order to supply material to the belt 46 I show hopper mechanism indicated generally at 50. The hopper includes supporting angle members 51 shown as mounted on the channels 19 with a transversely reinforcing member 52 intermediate the angle members 51 and with an upper reinforcing member 53 at each side. The hopper is indicated at 54 and includes a bottom portion 55 (see Fig. 6) which is shown as provided with a valve device indicated generally at 56.

This valve device 56 includes a discharge member 57 and a plurality of sleeve valve members 58. Each of the valve members 58 passes through slots and extends transversely across the portion 57 and includes downwardly extending portions 59 and operating portions 60. By shifting the operating portion 60 in and out, the width of the opening 61 and the location of this opening through which the material is discharged on the belt may be varied and thus the width and location of the material discharged onto the belt may be varied. The discharge device 56 preferably is inclined as shown in Fig. 1 and includes an adjustably inclined nozzle 62 which is vertically slidable on the valve device 56 and which may be held in place by set screws 63.

The nozzle 62 is disposed just above the endless belt conveyor 46 and the nozzle 62 in use is vertically adjusted so that the distance from the bottom thereof to the belt is spaced the required distance.

Mounted on the side plates 26 I show guides 65 (see Figs. 1 and 13). These guides 65 are engaged by a yoke member 66 which includes a bottom portion 67 and sides 68. The sides 68 are recessed at 69 to receive bearing blocks 70 at each end and each pair of these bearing blocks 70 support a shaft 71 on which drums 72 are mounted. A belt 73 which is endless passes over the drums and the lower reach of this belt is shown as spaced above the belt 46 previously described. The rear shaft 71 has a pulley 71a fixed thereon and this pulley is driven by a belt 71b from the pulley 43 previously mentioned.

Extending from one side plate 25 to the other I arrange a transverse member 74 which is shown as of channel shape and is disposed beneath the belt 46. This transverse member has a plate 75 secured thereto in which a rod 76 is mounted. This rod 76 passes through an aperture 77 in the lower end of the yoke and is threaded to receive nuts 78 and 79. Since the members 74, 75 and 76 are fixed to the frame it will be apparent that by shifting the nut 78 and the nut 79 the position of the yoke can be shifted vertically so that the position of the lower reach of the belt 73 with respect to the belt 46 can be varied.

Mounted on the frame 26 I show a supplemental frame which is indicated generally at 100. This frame 100 includes a base 101 which has an edge 102 in the form of a segment of a circle (see Fig. 14) and which is pivoted to shift about a shaft 103 on the base 101. A member 105 in the form of a flange is L-shaped in cross section and serves to hold the base against tipping. A table 104 is mounted on the lower end of a pair of arms 104' which are spaced apart and connected by a web 104" and which as shown in Fig. 11 have upper portions which include flanges 106 which engage lower guides 107 and upper guides 108 mounted on the side plates 25 of the frame 26.

The arms 104' may adjustably slide along the members 107 and 108 and in order to cause this sliding action I provide a cross member 109 which connects the arms 104'. This cross member is engaged by an operating member 110 which passes through an aperture 111 in the cross member 109 and is held in place by collars 112.

The operating member 110 extends through a threaded aperture in a yoke member 113 which is secured to spaced arms 114 which in turn are integral with and extend below the side plates 25. A lock nut 115 having an operating portion 116 thereon serves to hold the parts assembled while a crank 117 serves to move the operating member 110.

The base 101 includes upwardly extending supports 118 which are similar to the supports 27 previously described and these supports serve to support a pair of side plates 120 which are arranged on a sleeve 121 which is supported by the side plates 120 as shown in Fig. 10. Positioned in the sleeve 121 I provide a shaft 122. The side plates 120 are adapted to be shifted bodily by means of a gear 123 which is secured to one side plate 120 and which meshes with a worm 124 on a drive member 125 which is mounted on one of the supports 118.

An operating handle 125' serves to turn the gears so that the side plates 120 are raised and lowered as desired. Mounted on the shaft 122 I show a pair of pulleys 128 and 129 and in order to drive these pulleys I provide the shaft 122 with a coupling 128 to which a flexible drive shaft 129' is secured. This drive shaft loops downwardly and then upwardly and has its end 130 secured to the shaft 27 previously described so that when the shaft 27 rotates the shaft 122 will also rotate and will drive the pulleys 128 and 129.

The side plates 120 have a cross member 140 at the end thereof to which a rod 141 is secured by a pair of nuts 142 and 143. The free end of the rod 141 includes a yoke member 144 on which a shaft 145 is mounted and this shaft supports a drum 146. By adjusting the nuts 142 the effective length of the rod 141 may be changed. Also with this arrangement the yoke member 144 may be adjusted to various angular positions when desired. Extending over the drum 146 I show an endless belt 147 which also passes over a drum 148 mounted on the sleeve 121 previously mentioned.

The side plates 120 are provided with guides 150 in which a yoke member 151 slides. This yoke member includes a support 152 for a hopper 153 which is provided with a bottom portion 154 which includes a valve device 155 and nozzle 156 which are similar in all respects to the valve device 56 and nozzle 62 previously described.

The roller drum 146 is adapted to be driven by a pulley 157 which is secured to the shaft 145. The pulley 157 is driven by a belt 158 from a pulley 159 which is mounted on a sleeve 160. Also mounted on the sleeve 160 I provide a pulley 161 which is driven by a belt 162 from the pulley 163 on the sleeve 127. The sleeve 160 is rotatably mounted on a suitable stud shaft 164 supporting on side plates 129. Adjacent the stud shaft I provide a pair of idler rollers 165 the upper one of which engages the under face of the belt 147 and the lower one which engages the upper face of the lower belt 147.

Pivotally mounted on the shaft 27 I provide a deflector member 166 having a wall 167 which is adapted to be adjusted to direct material from the belt 46 downwardly at an angle onto the belt 147. Pivotally mounted on the shaft 145 I provide a similar deflector member 168 which includes wall portion 169 which is adapted to direct material from the belt 147 at a desired angle.

Mounted on the yoke member 66 adjacent the nozzle 62 I provide a transverse pipe member 170 which is provided with a plurality of nozzles 171 (see Fig. 15). Fluid from any suitable source is directed into the pipe 170 and suitable flexible hose member 172. Adjacent the roller 47 I provide a similar transverse pipe member 173 which is supported on members 174 which are secured to the side plates 25. Fluid from a suitable source is directed to the pipe 173 through a flexible hose 175.

Mounted on the side plates 111 I show guides 177. These guides 177 are engaged by a yoke member 178 which includes a bottom portion 179 and sides 180. Sides 180 are recessed as at 181 to receive bearing blocks 182 at each end and these bearing blocks 182 support shafts 183 on which drums 184 are mounted. A belt 185 which is endless passes over the drums and the lower reach of this belt is shown as spaced above the upper reach of the belt 147 previously described.

Extending from one side plate 111 to the other I arrange a transverse member 186. This transverse member has a depending rod 188 mounted thereon. This rod 188 passes through an aperture 189 in the transverse portion of the yoke 178 and is threaded to receive nuts 190.

Since the member 186 is fixed it will be apparent that by shifting the nuts 190 the position of the yoke 178 can be shifted vertically so that the position of the lower reach of the belt 185 with respect to the belt 147 can be varied. In Fig. 17 I have shown a belt 200 having raised cleats 201 thereon. This belt is adapted to replace either the belt 73 or the belt 185. When the belt 200 is used the cleats 201 form a design in the plastic material as it passes thereunder.

In the use of my apparatus the handle 34 is turned to shift the conveyor belt mechanism to the desired position. Crank 117 is then actuated to correctly position the second belt conveyor. The second belt conveyor may then be shifted about its axis and may be tilted if desired. The valve device 56 is then set in the proper place with the portions 59 thereof disposed so that the material will be discharged onto the first belt conveyor in the proper manner and place. The belt 73 as well as the belt 185 is set at the correct distance from the conveyor belts 46 and 147 to give the correct smoothing action. The deflector members 166 and 168 are also adjusted.

The motor is then started and material is fed to the hopper 50 causing the conveyor mechanism to function and rapidly advancing the plastering material along the belt conveyors. The material on the belt conveyors 46 passes beneath the belt 73 so that it is arranged in a smooth layer of uniform thickness on the conveyors 46. This material is rapidly advanced and is thrown off centrifugally striking the deflector 166 and passing onto the conveyors 147 where it is smoothed by the belt 185 and passes rapidly along until discharged by centrifugal force from the free end of the conveyor 147 where it strikes the deflector 168 and then passes to the wall.

The conveyors are suitably timed and rotated and the second belt may be tilted if desired so that the plaster may be applied in horizontal strips which may be of considerable width when the conveyor is tilted or the plaster may be applied in vertical strips. The truck 11 is suitably shifted to allow rapid operation.

By rotating the second belt conveyor about the pin 103 places which are inaccessible may be reached. Also by removing the second belt conveyor by loosening the pin 103 and lifting the conveyor it may be transported bodily and used to plaster around windows and other places otherwise inaccessible. This portable operation is enabled to be performed due to the flexible drive member 129.

The material which is indicated at 185 in Fig. 15 as it passes beneath the nozzle 171 may be treated with water, coloring material, etc.

If the material 185 which is to be applied is metal as in metallizing the members 171 may be in the nature of gas burners so that the material 185 would be liquefied. In this case the upper belt 73 would preferably be adjusted sufficiently high so that it would not engage the material. In this way a wide metal ribbon may be liquefied and centrifugally applied as a coating.

The belt shown in Fig. 17 may be used to replace either the belt 73 or 175 so that various designs may be made in the plastic material and when this material is centrifugally applied different designs will be preserved in the applied material.

From the foregoing description it will be apparent that I have invented a novel material applying apparatus which can be economically manufactured and which is highly efficient in use.

Having thus described my invention I claim:

1. In an apparatus of the class described, a belt conveyor, means to deliver material to the belt conveyor, means associated with the belt conveyor to form a pattern on the material delivered upon the belt conveyor and means to drive the belt conveyor and thereby advance the patterned formed material.

2. In an apparatus of the class described, a belt conveyor, means to deliver material to the belt conveyor, means to heat the material delivered to the belt conveyor, an endless smoothing member above the first conveyor and adapted to engage material on the first conveyor and means to drive the belt conveyor.

3. In a plastering machine, a belt conveyor, means to discharge plastic material onto the belt conveyor, means to mount said conveyor for bodily pivotal movement, other means to mount said conveyor to shift the reaches so that one edge is higher than the other, and means to drive the conveyor.

4. In a plastering machine, a belt conveyor, a second belt conveyor below and in advance of said first conveyor, means to drive said conveyors, said first belt conveyor being adapted to discharge material onto the second belt conveyor, means above and moving along with the first belt conveyor to smooth material on the first belt conveyor, and means to tilt the second belt conveyor so that the reaches thereof are inclined.

5. In an apparatus of the class described, an endless belt conveyor, a hopper adapted to feed material to said conveyor, a second endless conveyor, means to support said second endless conveyor on the first endless conveyor, means to swing said second belt conveyor independent of the first conveyor and means to tilt said second endless conveyor.

6. In an apparatus of the class described, an endless belt conveyor, a hopper adapted to feed material to said conveyor, a second endless conveyor, means to support said second endless conveyor on the first endless conveyor, means to swing said second belt conveyor support independent of the first conveyor and means to discharge material from the second endless conveyor.

7. In an apparatus of the class described, a hopper, an endless belt adapted to receive material from the hopper, means to drive the belt, means above the belt to smooth material thereon, a second belt conveyor including an end disposed under said first belt conveyor to receive material from the first belt conveyor, means above said second belt conveyor to smooth material thereon, means above each of said belt conveyors to supply material thereto and means to drive all of said belt conveyors.

8. In an apparatus of the class described, a hopper, an endless belt adapted to receive material from the hopper, means to drive the belt, means above the belt to smooth material thereon, said smoothing means including a pattern forming means, a second belt conveyor including an end disposed under said first belt conveyor to receive material from the first belt conveyor, means above said second belt conveyor to smooth material thereon, means above the second belt conveyor to supply material thereto and means to drive all of said belt conveyors.

9. In a plastering machine, a belt conveyor, a hopper adapted to discharge material onto the belt conveyor, a second belt conveyor, means to drive said conveyors, said first belt conveyor being adapted to discharge material onto the second belt conveyor, means to smooth material after it has been discharged from said hopper onto the first belt conveyor, means to pivotally support the second belt conveyor on the first belt conveyor and means to tilt the second belt conveyor about a longitudinal axis so that the reaches thereof are inclined.

10. In an apparatus of the character described, a frame, means to swing said frame, a shaft on said frame, a drum on said shaft, a second drum on said frame and remote from said first drum, an endless belt passing over said drums, means to drive said belt, a pair of drums mounted above said belt, means to shift said pair of drums, a second endless belt passing over said pair of drums, a hopper including a discharge aperture, a second endless conveyor pivotally mounted on said frame, said second endless conveyor including an endless belt device with an auxiliary belt device above said first belt device and means to swing said second belt device independent of said first belt.

11. In an apparatus of the character described, a frame, means to swing said frame, a shaft on said frame, a drum on said shaft, a second drum on said frame and remote from said first drum, an endless belt passing over said drums, means to drive said belt, a pair of drums mounted above said belt, means to shift said pair of drums, a second endless belt passing over said pair of drums, a hopper including a discharge aperture, a second endless conveyor pivotally mounted on said frame, said second endless conveyor including an endless belt device with an auxiliary belt device above said first belt device, means to swing said second belt device independent of said first belt, means to tilt said second belt conveyor and means to direct material from the first belt conveyor onto the second belt conveyor.

12. In an apparatus of the character described, a frame, said frame including a pair of side plates, means to swing said frame about its axis, a shaft on said frame, a drum on said shaft, a second drum on said frame and remote from said first drum, an endless belt passing over said drums, means to drive said belt, a pair of drums mounted above said belt, means to shift said pair of drums, a second endless belt passing over said pair of drums, a hopper including a discharge aperture, a valve for controlling passage of material through said aperture, a second endless conveyor pivotally mounted on said frame, said second endless conveyor including an endless belt device with an auxiliary belt device above said second conveyor, means to swing said second belt device independent of said first belt, means to tilt said second belt conveyor, means to direct material from the first belt conveyor onto the second belt conveyor and means to deflect material passing from the second belt conveyor.

13. In an apparatus of the character described, a frame including a pair of side plates, a drum on said frame, a second drum on said frame and remote from said first drum, an endless belt passing over said drums, a shaft on which said second drum is mounted, a yoke member mounted to slide on said yoke member, an endless belt mounted on said yoke member, said endless belt having its lower reach spaced above the upper reach of the first mentioned belt, a hopper mounted on said base, said hopper including a discharge aperture, a valve for controlling passage of material through said aperture, said valve including a pair of slidably mounted members adapted to control the width and position of the discharge from said hopper, a nozzle communicating with said valve and disposed above the upper reach of said first belt and means to adjust said nozzle towards and from the belt.

14. In an apparatus of the character described, a truck, a frame on said truck and mounted to swing about a horizontal axis, said frame including a pair of side plates, gear means to swing said frame about its axis, a shaft on said frame, a sleeve on said shaft, a drum freely rotatable on said shaft, a motor, means whereby said motor drives said sleeve, a pair of pulleys secured to said sleeve, a second drum on said frame and remote from said first drum, an endless belt passing over said drums, a shaft on which said second drum is mounted, a pulley on said shaft, a belt connecting said last mentioned pulley and one of said first mentioned pulleys whereby the second mentioned pulley is driven, a yoke member mounted to slide on said side plates, means to shift said yoke member, a pair of drums mounted on said yoke member and an endless belt passing over said yoke member drum, said endless belt having its lower reach spaced above the upper reach of the first mentioned belt.

15. In an apparatus of the character described, a truck, a frame on said truck and mounted to swing about a horizontal axis, said frame including a pair of side plates, gear means to swing said frame about its axis, a shaft on said frame, a sleeve on said shaft, a drum freely rotatable on said shaft, a motor, means whereby said motor drives said sleeve, a pair of pulleys secured to said sleeve, a second drum on said frame and remote from said first drum, an endless belt passing over said drums, a shaft on which said second drum is mounted, a pulley on said shaft, a belt connecting said last mentioned pulley and one of said first mentioned pulleys whereby the second mentioned pulley is driven, a yoke member mounted to slide on said side plates, means to shift said yoke member, a pair of drums mounted on said yoke member, an endless belt passing over said yoke member drum, said endless belt having its lower reach spaced above the upper reach of the first mentioned belt, a hopper mounted on said base, said hopper including a discharge aperture, a valve for controlling passage of material through said aperture, said valve including a pair of slidably mounted members adapted to control the width and location of the discharge from said hopper, a nozzle communicating with said valve and disposed above the upper reach of said first belt.

16. In an apparatus of the character described, a truck, a post rotatably mounted on the truck to rotate about a vertical axis, a base on said post, said base including a pair of supports, a frame mounted to swing on said base about a horizontal axis, said frame including a pair of side plates, gear means to swing said frame about its axis, a shaft on said frame, a sleeve on said shaft, a drum freely rotatable on said shaft, a sprocket secured to said sleeve, a motor on said support, a sprocket driven by said motor, a chain passing over said two sprockets whereby said motor drives said sleeve, a pair of pulleys secured to said sleeve, a second drum on said frame and remote from said first drum, an endless belt passing over said drums, a shaft on which said second drum is mounted, a pulley on said shaft, a belt connecting said last mentioned pulley and one of said first mentioned pulleys whereby the second mentioned pulley is driven, a yoke member mounted to slide on said frame, an endless belt mounted in said yoke member, said endless belt having its lower reach spaced above the upper reach of the first mentioned belt, a hopper mounted on said base, said hopper including a discharge aperture, a valve for controlling passage of material through said aperture, said valve including a pair of slidably mounted members adapted to control the width and position of the discharge from said hopper, a nozzle communicating with said valve and disposed above the upper reach of said first belt, means to adjust said nozzle towards and from the belt and a deflector member mounted adjacent said second drum and adapted to be impinged upon by a material passing from said first belt.

17. In an apparatus of the character described, a truck, a frame on said truck and mounted to swing about a horizontal axis, said frame including a pair of side plates, gear means to swing said frame about its axis, a shaft on said frame, a sleeve on said shaft, a drum freely rotatable on said shaft, a motor, means whereby said motor drives said sleeve, a pair of pulleys secured to said sleeve, a second drum on said frame and remote from said first drum, an endless belt passing over said drums, a shaft on which said second drum is mounted, a pulley on said shaft, a belt connecting said last mentioned pulley and one of said first mentioned pulleys whereby the second mentioned pulley is driven, a yoke member mounted to slide on said side plates, means to shift said yoke member, a pair of drums mounted on said yoke member, an endless belt passing over said yoke member drum, said endless belt having its lower reach spaced above the upper reach of the first mentiond belt, a hopper mounted on said base, said hopper including a discharge aperture, a valve for controlling passage of material through said aperture, said valve including a pair of slidably mounted members adapted to control the width and location of the discharge from said hopper, a nozzle communicating with said valve and disposed above the upper reach of said first belt, a table, means to mount said table on said frame for movement along the frame, means to shift said table, a base mounted for swinging movement on the table, supports on said base, an auxiliary frame mounted on said last mentioned supports, a third drum rotatable on said auxiliary frame, means to shift said auxiliary frame about a horizontal axis, a fourth drum on said auxiliary frame remote from said third drum, means to shift said fourth drum towards and from said third drum, a second endless belt conveyor passing over said third and fourth drums, a pair of auxiliary drums mounted above said second belt conveyor and flexible drive means for driving said fourth drum from said second drum.

18. In an apparatus of the class described, a belt conveyor, means to drive the belt conveyor, means to deliver plastic forming material to the belt conveyor, means to deliver fluid onto the material which has been delivered to the belt conveyor, means disposed above the belt conveyor in advance of both of said delivery means to force the delivered material against the belt conveyor and means to drive the last mentioned means.

19. In a portable plastering apparatus, a pair of spaced drums, an endless belt conveyor passing over said drums, means to support one end of said conveyor, said means including a rotatable member, a hopper adjacent the supported end of said conveyor, means to drive the conveyor, means adjacent said one end of the conveyor to smooth material on the conveyor, the portion of said conveyor in advance of the smoothing means having a free upper surface whereby the material on the conveyor advances in a sheet of uniform thickness whereby the material is discharged centrifugally when it operates.

20. In a portable plastering apparatus, a pair of spaced drums, an endless belt conveyor passing over said drums, means to support one end of said conveyor, the other end of said conveyor being free, a hopper disposed above said conveyor, means to drive the conveyor, means above the conveyor to smooth material discharged from the hopper onto the conveyor, the portion of said conveyor in advance of the smoothing means having a free upper surface whereby the material on the conveyor advances in a sheet of uniform thickness and is discharged centrifugally when the conveyor operates, a deflector member at the free end of the conveyor, means to adjustably mount said deflector member, said deflector member having a wall disposed to direct material discharged from the conveyor.

SPENCER A. EARNSHAW.